US008851297B2

(12) United States Patent
Ohara et al.

(10) Patent No.: US 8,851,297 B2
(45) Date of Patent: Oct. 7, 2014

(54) COMPOSITE SEMIPERMEABLE MEMBRANE AND PROCESS FOR PRODUCING THE SAME

(75) Inventors: Tomomi Ohara, Ibaraki (JP); Atsuhito Koumoto, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 530 days.

(21) Appl. No.: 12/606,518

(22) Filed: Oct. 27, 2009

(65) Prior Publication Data

US 2010/0044902 A1 Feb. 25, 2010

Related U.S. Application Data

(62) Division of application No. 11/869,678, filed on Oct. 9, 2007, now abandoned.

(30) Foreign Application Priority Data

Oct. 10, 2006 (JP) ................. 2006-276661

(51) Int. Cl.
- *B01D 71/56* (2006.01)
- *B01D 69/02* (2006.01)
- *B01D 69/12* (2006.01)
- *B01D 61/02* (2006.01)
- *B01D 67/00* (2006.01)
- *B01D 69/14* (2006.01)
- *B01D 61/00* (2006.01)
- *C02F 1/44* (2006.01)

(52) U.S. Cl.
CPC .......... *B01D 69/125* (2013.01); *B01D 2325/28* (2013.01); *B01D 2325/48* (2013.01); *B01D 71/56* (2013.01); *B01D 61/025* (2013.01); *B01D 2323/46* (2013.01); *B01D 67/0093* (2013.01); *B01D 67/0006* (2013.01); *B01D 69/148* (2013.01)
USPC ............ 210/500.38; 210/500.21; 210/506; 210/507; 264/45.5; 264/48

(58) Field of Classification Search
CPC .......... B01D 67/0081; B01D 67/0093; B01D 69/125; B01D 71/56; B01D 2323/40; B01D 2323/42; B01D 2323/46
USPC ............ 210/490, 500.38, 652, 654; 427/244, 427/245
See application file for complete search history.

(56) References Cited

U.S. PATENT DOCUMENTS

| 2,727,087 | A | 12/1955 | Hull |
|---|---|---|---|
| 3,023,300 | A | 2/1962 | Lehnert |
| 3,133,132 | A | 5/1964 | Loeb et al. |
| 3,133,137 | A | 5/1964 | Loeb et al. |
| 3,567,632 | A | 3/1971 | Richter et al. |
| 3,744,642 | A | 7/1973 | Scala et al. |
| 4,005,012 | A | 1/1977 | Wrasidlo |
| 4,277,344 | A | 7/1981 | Cadotte |
| 4,520,044 | A | 5/1985 | Sundet |
| 4,529,646 | A | 7/1985 | Sundet |
| 4,761,234 | A | 8/1988 | Uemura et al. |
| 4,769,148 | A | 9/1988 | Fibiger et al. |
| 4,830,885 | A | 5/1989 | Tran et al. |
| 4,872,984 | A | 10/1989 | Tomaschke |
| 4,938,872 | A | 7/1990 | Strantz et al. |
| 4,948,507 | A | 8/1990 | Tomaschke |
| 4,950,404 | A | 8/1990 | Chau |
| 4,964,998 | A | 10/1990 | Cadotte et al. |
| 4,983,291 | A | 1/1991 | Chau et al. |
| 5,152,901 | A | 10/1992 | Hodgdon |
| 5,173,335 | A | 12/1992 | Arthur |
| 5,207,908 | A | 5/1993 | Koenhen et al. |
| 5,234,598 | A | 8/1993 | Tran et al. |
| 5,254,261 | A | 10/1993 | Tomaschke et al. |
| 5,547,701 | A | 8/1996 | Nielsen et al. |
| 5,582,725 | A | 12/1996 | McCray et al. |
| 5,693,227 | A | 12/1997 | Costa |
| 5,746,916 | A | 5/1998 | Kamo et al. |
| 5,783,079 | A * | 7/1998 | Kumano et al. .......... 210/500.23 |
| 6,015,495 | A | 1/2000 | Koo et al. |
| 6,024,873 | A | 2/2000 | Hirose et al. |

(Continued)

FOREIGN PATENT DOCUMENTS

| CA | 2045109 | 12/1992 |
|---|---|---|
| EP | 0394 038 | 4/1990 |

(Continued)

OTHER PUBLICATIONS

Office Action issued by the State Intellectual Property Office of People's Republic of China dated May 4, 2011 for the counterpart Chinese Patent Application No. 200710180901.3.

Chinese Office Action issued on the related Chinese Patent Application No. 200580032709.9, dated Jul. 18, 2008.

International Preliminary Report on Patentability issued on the related PCT Application No. PCT/JP2005/ 016247, dated Apr. 3, 2007.

International Preliminary Report on patentability issued on the related PCT Application No. PCT/JP2005/016247, dated Apr. 11, 2007.

(Continued)

*Primary Examiner* — Katherine Zalasky
(74) *Attorney, Agent, or Firm* — Knobbe, Martens, Olson & Bear LLP

(57) ABSTRACT

The present invention aims at providing a composite semipermeable membrane in which water permeability and salt-blocking rate cannot deteriorate by long-term storage, and at providing a process for producing the same. The present invention relates to a composite semipermeable membrane having a skin layer formed on the surface of a porous support, the skin layer including a polyamide resin obtained by interfacial polymerization of a polyfunctional amine component and a polyfunctional acid halide component, wherein the porous support contains at least one kind of additives selected from the group consisting of antioxidants, antibacterial agents, antifungal agents, and moisturizers, in an amount of 95% by weight or more with respect to the whole composite semipermeable membrane.

16 Claims, No Drawings

(56) References Cited

U.S. PATENT DOCUMENTS

| | | |
|---|---|---|
| 6,132,804 A | 10/2000 | Rice et al. |
| 6,162,358 A | 12/2000 | Li et al. |
| 6,177,011 B1 | 1/2001 | Hachisuka et al. |
| 6,413,425 B1 | 7/2002 | Hachisuka et al. |
| 6,413,475 B2 | 7/2002 | Ishizawa et al. |
| 6,536,605 B2 | 3/2003 | Rice et al. |
| 6,551,536 B1 | 4/2003 | Kwak et al. |
| 6,878,278 B2 | 4/2005 | Mickols |
| 7,553,413 B2 | 6/2009 | Dorian et al. |
| 7,727,434 B2 | 6/2010 | Kniajanski et al. |
| 8,518,310 B2 | 8/2013 | Koumoto et al. |
| 2002/0063093 A1 | 5/2002 | Rice et al. |
| 2002/0113008 A1 | 8/2002 | Mickols |
| 2004/0222146 A1 | 11/2004 | Hirose et al. |
| 2008/0053893 A1 | 3/2008 | Ohara et al. |
| 2008/0083670 A1 | 4/2008 | Ohara et al. |
| 2008/0251447 A1 | 10/2008 | Koumoto et al. |
| 2008/0257818 A1 | 10/2008 | Konishi et al. |
| 2008/0277334 A1 | 11/2008 | Ohara et al. |
| 2009/0050558 A1 | 2/2009 | Ishizuka et al. |
| 2010/0173083 A1 | 7/2010 | Ohara et al. |
| 2010/0176052 A1 | 7/2010 | Koumoto et al. |

FOREIGN PATENT DOCUMENTS

| | | |
|---|---|---|
| EP | 0 523 295 A1 | 1/1993 |
| JP | 53-016373 | 2/1978 |
| JP | 55-147106 | 11/1980 |
| JP | 58-180206 | 10/1983 |
| JP | 61-42308 | 2/1986 |
| JP | 61-046207 | 3/1986 |
| JP | 62-121603 | 6/1987 |
| JP | 62-197105 | 8/1987 |
| JP | 63-218208 | 9/1988 |
| JP | 2-78428 | 3/1990 |
| JP | 2-187135 | 7/1990 |
| JP | 5-023558 | 2/1993 |
| JP | 2510530 B | 4/1996 |
| JP | 8-509162 | 10/1996 |
| JP | 10-165789 | 6/1998 |
| JP | 2947291 | 7/1999 |
| JP | 11-319517 | 11/1999 |
| JP | 2000-24470 | 1/2000 |
| JP | 3015853 | 3/2000 |
| JP | 2000-153137 | 6/2000 |
| JP | 2000-300974 | 10/2000 |
| JP | 2000-325759 | 11/2000 |
| JP | 2000-350928 | 12/2000 |
| JP | 2001-038175 | 2/2001 |
| JP | 2001-179061 | 7/2001 |
| JP | 2001-286741 | 10/2001 |
| JP | 2002-095939 | 4/2002 |
| JP | 2002-136849 | 5/2002 |
| JP | 2002-177750 | 6/2002 |
| JP | 2002-516743 | 6/2002 |
| JP | 2002-355938 | 12/2002 |
| JP | 3379963 | 12/2002 |
| JP | 2003-275652 | 9/2003 |
| JP | 2003-320224 | 11/2003 |
| JP | 3525759 | 2/2004 |
| JP | 2005-066464 | 3/2005 |
| JP | 2005-137964 | 6/2005 |
| JP | 2006-122887 | 5/2006 |
| JP | 2006-272148 | 10/2006 |
| WO | WO 91/03311 | 3/1991 |
| WO | WO 99/62623 | 12/1999 |
| WO | WO 94/23943 | 10/2004 |
| WO | WO 2006/038425 * | 4/2006 |

OTHER PUBLICATIONS

International Preliminary Report on Patentability issued on the related PCT Application No. PCT/JP2005/016617, dated Apr. 3, 2007.

International Preliminary Report on patentability issued on the related PCT Application No. PCT/JP2005/016617, dated Apr. 11, 2007.

International Preliminary Report on Patentability issued on the related PCT Application No. PCT/JP2005/016618, dated Apr. 3, 2007.

International Preliminary Report on Patentability issued on the related PCT Application No. PCT/JP2005/016618, dated Apr. 11, 2007.

International Search Report issued on the related PCT Application No. PCT/JP2005/016247, dated Oct. 4, 2005.

International Search Report issued on the related PCT Application No. PCT/JP2005/016617, dated Dec. 6, 2007.

International Search Report issued on the related PCT Application No. PCT/JP2005/016618, dated Dec. 6, 2005.

International Search Report issued on the related PCT Application No. PCT/JP2005/017829, dated Dec. 6, 2005.

Supplementary European Search Report issued on the related European Application No. 05782337.9, dated Apr. 7, 2008.

Supplementary European Search Report issued on the related European Application No. 05781415.4, dated Apr. 7, 2008.

Supplementary European Search Report issued on the related European Application No. 05787916.5, dated Apr. 17, 2008.

File History of the related U.S. Appl. No. 11/664,428, as of Oct. 14, 2009.

File History of the related U.S. Appl. No. 11/664,371, as of Oct. 14, 2009.

File History of the related U.S. Appl. No. 11/664,254, as of Oct. 14, 2009.

File History of the related U.S. Appl. No. 11/576,598, as of Oct. 14, 2009.

File History of the related U.S. Appl. No. 11/869,568, as of Oct. 14, 2009.

File History of the related U.S. Appl. No. 12/593,844, as of Oct. 14, 2009.

Notification of Reasons for Refusal issued by Japanese Patent Office in corresponding application No. 2006-276661, dated Feb. 13, 2012.

Notice of Preliminary Rejection dated Sep. 5, 2013 in corresponding Korean patent application No. 10-2007-0101304.

* cited by examiner

COMPOSITE SEMIPERMEABLE MEMBRANE AND PROCESS FOR PRODUCING THE SAME

CROSS-REFERENCE TO PRIORITY AND RELATED APPLICATIONS

This application is a divisional application of U.S. patent application Ser. No. 11/869,678, filed Oct. 9, 2007, which claims priority to Japanese Patent Application No. 2006-276661, filed Oct. 10, 2006. The disclosure of the above-referenced application is incorporated by reference herein. This application also is related to U.S. patent application Ser. No. 11/664,428, filed Mar. 30, 2007, Ser. No. 11/664,371, filed Mar. 30, 2007, Ser. No. 11/664,254, filed Mar. 30, 2007, Ser. No. 11/576,598, filed Oct. 21, 2008, Ser. No. 11/869,568, filed Oct. 9, 2007, Ser. No. 11/869,678, filed Oct. 9, 2007, and Ser. No. 12/593,844, filed Sep. 29, 2009.

FIELD OF THE INVENTION

The present invention relates to a composite semipermeable membrane having a skin layer which includes a polyamide resin and a porous support that supports the skin layer, and to a process for producing the composite semipermeable membrane. The composite semipermeable membranes are suitably used for production of ultrapure water, desalination of brackish water or sea water, etc., and usable for removing or collecting pollution sources or effective substances from pollution, which causes environment pollution occurrence, such as dyeing drainage and electrodeposition paint drainage, leading to contribute to closed system for drainage. Furthermore, the membrane can be used for concentration of active ingredients in foodstuffs usage, for an advanced water treatment, such as removal of harmful component in water purification and sewage usage etc.

DESCRIPTION OF THE RELATED ART

Recently, a composite semipermeable membrane, in which a skin layer includes polyamides obtained by interfacial polymerization of polyfunctional aromatic amines and polyfunctional aromatic acid halides and is formed on a porous support, has been proposed (Patent Document 1). A composite semipermeable membrane, in which a skin layer includes a polyamide obtained by interfacial polymerization of a polyfunctional aromatic amine and a polyfunctional alicyclic acid halide and is formed on a porous support, has been also proposed (Patent Document 2).

However, when it is needed to obtain a target compounds condensed or refined as permeated liquid or non-permeated liquids using conventional composite semipermeable membranes in actual cases, there has occurred a problem of unstable water quality of target compounds due to deterioration with time of performances, such as water permeability and solute blocking property, of the composite semipermeable membranes.

On the other hand, from viewpoints of subsequent workability, preservability, etc., the composite semipermeable membrane produced is preferably a dried composite semipermeable membrane. However, when a composite semipermeable membrane having a skin layer formed on the surface of the porous support is dried, there has occurred a problem of deterioration of salt-blocking performance and permeation flux, compared with characteristics before drying. A technique in which a reverse osmosis membrane is dried after hydrophilization treatment for the purpose of solving the problem has been disclosed (Patent Document 3). Furthermore, a method of drying a composite membrane after immersion treatment in a solution of saccharides having a molecular weight of 1000 or less has been disclosed (Patent Document 4).

In order to obtain a dried composite reverse osmosis membrane having outstanding water permeability, organic matter blocking performance, and salt-blocking performance, a method of performing heat drying treatment of a compound reverse osmosis membrane after contact to an aqueous solution at a temperature of 40 to 100° C. has been disclosed (Patent Document 5).

However, various kinds of above-described treatments, for the purpose of control of deterioration of the performance and quality, applied to a composite semipermeable membrane having a skin layer formed on the surface of a porous support conversely promotes deterioration of salt-blocking performance and permeation flux depending on kinds of chemicals used, treatment method, etc., in some case.

[Patent Document 1] Japanese Patent Application Laid-Open No. 02-187135
[Patent Document 2] Japanese Patent Application Laid-Open No. 62-121603
[Patent Document 3] Japanese Patent Application Laid-Open No. 2003-320224
[Patent Document 4] U.S. Pat. No. 3,015,853 specification
[Patent Document 5] Japanese Patent Application Laid-Open No. 10-165789

SUMMARY OF THE INVENTION

The present invention aims at providing a composite semipermeable membrane in which water permeability and salt-blocking rate cannot deteriorate by long-term storage, and at providing a process for producing the same.

As a result of wholehearted investigation conducted by the present inventors for attaining the above-described objectives, it has been found out that inclusion of specific additives in a porous support after formation of a skin layer can provide a composite semipermeable membrane in which water permeability and salt-blocking rate cannot deteriorate after long-term storage, leading to completion of the present invention.

That is, the present invention relates to a composite semipermeable membrane having a skin layer formed on the surface of a porous support, the skin layer including a polyamide resin obtained by interfacial polymerization of a polyfunctional amine component and a polyfunctional acid halide component, wherein the porous support contains at least one kind of additives selected from the group consisting of antioxidants, antibacterial agents, antifungal agents, and moisturizers, in an amount of 95% by weight or more with respect to the whole composite semipermeable membrane.

Reasons for deterioration with time of performances, such as water permeability and solute blocking property, of a composite semipermeable membrane include possible degradation of the composite semipermeable membrane by increase of bacillus, appearance of mold, structural change by drying at the time of storage, and chemical change by oxidation, etc.

Furthermore, various treatments, as applied in various treatments for conventional composite semipermeable membranes, by entire immersion, etc., of the composite semipermeable membranes with a flat film form or with a processed spiral element form allow expression of objective function by the treatment agent, but at the same time the treatment possibly gives unpreferable modification, such as swelling, hydrolysis, denaturation, etc., to the skin layer, and some treatment measure may give physical damage to the skin layer. Such possibilities are considered to be one of the causes of degradation of the composite semipermeable membrane.

The composite semipermeable membrane of the present invention is characterized by including the above-described additives mainly in the porous support. For this reason, the composite semipermeable membrane of the present invention can minimize secondary adverse effect to the skin layer, and can exhibit characteristics of giving no deterioration in water permeability and salt-blocking rate by long-term storage without deterioration of performance of the skin layer.

The composite semipermeable membrane of the present invention is preferred to be a dried composite semipermeable membrane from viewpoints of workability, preservability, stability of quality and performance.

In the present invention, moisturizers are preferably of organic acid metal salts and/or inorganic acid metal salts.

The organic acid metal salt preferably include at least one kind of organic acid alkali metal salt selected from the group consisting of alkali metal acetate, alkali metal lactate, and alkali metal glutamate. The alkali metal is preferably selected from sodium or potassium.

In addition, the inorganic acid metal salt preferably includes at least one kind of inorganic acid alkali metal salt selected from the group consisting of alkali metal hydrogencarbonate, dialkali metal monohydrogen phosphate, monoalkali metal dihydrogen phosphate. The alkali metal is preferably selected from sodium or potassium.

Although a prolonged moisturing treatment is needed in order to obtain necessary effect when using as surfactants and saccharides as a moisturizer, use of the organic acid metal salts and/or inorganic acid metal salts can give sufficient effect by extremely short-time moisturing treatment, leading to great advantage on the productive process. In addition, although use of the surfactants or saccharides as a moisturizer may give poor effect depending on drying conditions (temperature, period of time, etc.), use of the organic acid metal salts and/or inorganic acid metal salts can provide sufficient effect independently of dry conditions, resulting in great advantage on the productive processes.

The present invention also relates to a process for producing a composite semipermeable membrane comprising the steps of: forming a skin layer including a polyamide resin obtained by reaction between a polyfunctional amine component and a polyfunctional acid halide component on the surface of a porous support; and performing a treatment with additives onto the porous support by contact of an aqueous solution including at least one kind of additives selected from the group consisting of an antioxidant, an antibacterial agent, an antifungal agent, and a moisturizer, to a face without the skin layer of the porous support.

BEST MODE FOR CARRYING OUT OF THE INVENTION

The embodiments of the invention will, hereinafter, be described. In the composite semipermeable membrane of the present invention, a skin layer containing a polyamide resin obtained by interfacial polymerization of a polyfunctional amine component and a polyfunctional acid halide component is formed on the surface of a porous support, and the porous support contains at least one kind of additives selected from the group consisting of antioxidants, antibacterial agents, antifungal agents, and moisturizers in an amount of 95% by weight or more with respect to the total weight of the composite semipermeable membrane.

The polyfunctional amine component is defined as a polyfunctional amine having two or more reactive amino groups, and includes aromatic, aliphatic, and alicyclic polyfunctional amines.

The aromatic polyfunctional amines include, for example, m-phenylenediamine, p-phenylenediamine, o-phenylenediamine, 1,3,5-triamino benzene, 1,2,4-triamino benzene, 3,5-diaminobenzoic acid, 2,4-diaminotoluene, 2,6-diaminotoluene, N,N'-dimethyl-m-phenylenediamine, 2,4-diaminoanisole, amidol, xylylene diamine etc.

The aliphatic polyfunctional amines include, for example, ethylenediamine, propylenediamine, tris(2-aminoethyl) amine, n-phenylethylenediamine, etc.

The alicyclic polyfunctional amines include, for example, 1,3-diaminocyclohexane, 1,2-diaminocyclohexane, 1,4-diaminocyclohexane, piperazine, 2,5-dimethylpiperazine, 4-aminomethyl piperazine, etc.

These polyfunctional amines may be used independently, and two or more kinds may be used in combination. In order to obtain a skin layer having a higher salt-blocking property, it is preferred to use the aromatic polyfunctional amines.

The polyfunctional acid halide component represents polyfunctional acid halides having two or more reactive carbonyl groups.

The polyfunctional acid halides include aromatic, aliphatic, and alicyclic polyfunctional acid halides.

The aromatic polyfunctional acid halides include, for example trimesic acid trichloride, terephthalic acid dichloride, isophthalic acid dichloride, biphenyl dicarboxylic acid dichloride, naphthalene dicarboxylic acid dichloride, benzenetrisulfonic acid trichloride, benzenedisulfonic acid dichloride, chlorosulfonyl benzenedicarboxylic acid dichloride etc.

The aliphatic polyfunctional acid halides include, for example, propanedicarboxylic acid dichloride, butane dicarboxylic acid dichloride, pentanedicarboxylic acid dichloride, propane tricarboxylic acid trichloride, butane tricarboxylic acid trichloride, pentane tricarboxylic acid trichloride, glutaryl halide, adipoyl halide etc.

The alicyclic polyfunctional acid halides include, for example, cyclopropane tricarboxylic acid trichloride, cyclobutanetetracarboxylic acid tetrachloride, cyclopentane tricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, tetrahydrofuran dicarboxylic acid dichloride, etc.

These polyfunctional acid halides may be used independently, and two or more kinds may be used in combination. In order to obtain a skin layer having higher salt-blocking property, it is preferred to use aromatic polyfunctional acid halides. In addition, it is preferred to form a cross linked structure using polyfunctional acid halides having trivalency or more as at least a part of the polyfunctional acid halide components.

Furthermore, in order to improve performance of the skin layer including the polyamide resin, polymers such as polyvinyl alcohol, polyvinylpyrrolidone, and polyacrylic acids etc., and polyhydric alcohols, such as sorbitol and glycerin, may be copolymerized.

The porous support for supporting the skin layer is not especially limited as long as it has a function for supporting the skin layer, and usually ultrafiltration membrane having micro pores with an average pore size approximately 10 to 500 angstroms may preferably be used. Materials for formation of the porous support include various materials, for example, polyarylether sulfones, such as polysulfones and polyether sulfones; polyimides; polyvinylidene fluorides; etc., and polysulfones and polyarylether sulfones are especially preferably used from a viewpoint of chemical, mechanical, and thermal stability. The thickness of this porous support is usually approximately 25 to 125 µm, and preferably approximately 40 to 75 µm, but the thickness is not necessarily limited to them. The porous support may be reinforced with backing by cloths, nonwoven fabric, etc.

Processes for forming the skin layer including the polyamide resin on the surface of the porous support is not in particular limited, and any publicly known methods may be used. For example, the publicly known methods include an interfacial condensation method, a phase separation method, a thin film application method, etc. The interfacial condensation method is a method, wherein an amine aqueous solution containing a polyfunctional amine component, an organic solution containing a polyfunctional acid halide component are forced to contact together to form a skin layer by an interfacial polymerization, and then the obtained skin layer is laid on a porous support, and a method wherein a skin layer of a polyamide resin is directly formed on a porous support by the above-described interfacial polymerization on a porous support. Details, such as conditions of the interfacial condensation method, are described in Japanese Patent Application Laid-Open No. 58-24303, Japanese Patent Application Laid-Open No. 01-180208, and these known methods are suitably employable.

In the present invention, it is especially preferred that a covering layer of aqueous solution made from the amine aqueous solution containing a polyfunctional amine components is formed on the porous support, then an interfacial polymerization is performed by contact with an organic solution containing a polyfunctional acid halide component, and the covering layer of aqueous solution, and then a skin layer is formed.

In the interfacial-polymerization method, although the concentration of the polyfunctional amine component in the amine aqueous solution is not in particular limited, the concentration is preferably 0.1 to 5% by weight, and more preferably 0.5 to 2% by weight. Less than 0.1% by weight of the concentration of the polyfunctional amine component may easily cause defect such as pinhole. in the skin layer, leading to tendency of deterioration of salt-blocking property. On the other hand, the concentration of the polyfunctional amine component exceeding 5% by weight allows easy permeation of the polyfunctional amine component into the porous support to be an excessively large thickness and to raise the permeation resistance, likely giving deterioration of the permeation flux.

Although the concentration of the polyfunctional acid halide component in the organic solution is not in particular limited, it is preferably 0.01 to 5% by weight, and more preferably 0.05 to 3% by weight. Less than 0.01% by weight of the concentration of the polyfunctional acid halide component is apt to make the unreacted polyfunctional amine component remain, to cause defect such as pinhole in the skin layer, leading to tendency of deterioration of salt-blocking property. On the other hand, the concentration exceeding 5% by weight of the polyfunctional acid halide component is apt to make the unreacted polyfunctional acid halide component remain, to be an excessively large thickness and to raise the permeation resistance, likely giving deterioration of the permeation flux.

The organic solvents used for the organic solution is not especially limited as long as they have small solubility to water, and do not cause degradation of the porous support, and dissolve the polyfunctional acid halide component. For example, the organic solvents include saturated hydrocarbons, such as cyclohexane, heptane, octane, and nonane, halogenated hydrocarbons, such as 1,1,2-trichlorofluoroethane, etc. They are preferably saturated hydrocarbons having a boiling point of 300° C. or less, and more preferably 200° C. or less, or naphthene solvents.

Various kinds of additives may be added to the amine aqueous solution or the organic solution in order to provide easy film production and to improve performance of the composite semipermeable membrane to be obtained. The additives include, for example, surfactants, such as sodium dodecylbenzenesulfonate, sodium dodecyl sulfate, and sodium lauryl sulfate; basic compounds, such as sodium hydroxide, trisodium phosphate, triethylamine, etc. for removing hydrogen halides formed by polymerization; acylation catalysts; compounds having a solubility parameter of 8 to 14 $(cal/cm^3)^{1/2}$ described in Japanese Patent Application Laid-Open No. 08-224452.

The period of time after application of the amine aqueous solution until application of the organic solution on the porous support depends on the composition and viscosity of the amine aqueous solution, and on the pore size of the surface layer of the porous support, and it is preferably 15 seconds or less, and more preferably 5 seconds or less. Application interval of the solution exceeding 15 seconds may allow permeation and diffusion of the amine aqueous solution to a deeper portion in the porous support, and possibly cause a large amount of the residual unreacted polyfunctional amine components in the porous support. In this case, removal of the unreacted polyfunctional amine component that has permeated to the deeper portion in the porous support is probably difficult even with a subsequent membrane washing treatment. Excessive amine aqueous solution may be removed after covering by the amine aqueous solution on the porous support.

In the present invention, after the contact with the covering layer of aqueous solution and the organic solution including the amine aqueous solution, it is preferred to remove the excessive organic solution on the porous support, and to dry the formed membrane on the porous support by heating at a temperature of 70° C. or more, forming the skin layer. Heat-treatment of the formed membrane can improve the mechanical strength, heat-resisting property, etc. The heating temperature is more preferably 70 to 200° C., and especially preferably 100 to 150° C. The heating period of time is preferably approximately 30 seconds to 10 minutes, and more preferably approximately 40 seconds to 7 minutes.

The thickness of the skin layer formed on the porous support is not in particular limited, and it is usually approximately 0.05 to 2 µm, and preferably 0.1 to 1 µm.

In the present invention, a washed composite semipermeable membrane may be obtained by subsequently applying membrane washing treatment to the produced composite semipermeable membrane. The method of the membrane washing treatment is not in particular limited, and conventionally publicly known methods are employable. The following membrane washing treatment is especially preferably adopted.

1) Method of washing the membrane by contact of the composite semipermeable membrane with pure water or ion exchange water.

2) Method of washing the membrane by contact of the composite semipermeable membrane with an aqueous solution containing an acidic substance and/or an inorganic salt, and an water-soluble organic substance.

The acidic substance concerned is not in particular limited as long as it is water-soluble, and for example, inorganic acids, such as hydrochloric acid, sulfuric acid, and phosphoric acid; organic acids, such as formic acid, acetic acid, and citric acid, may be mentioned.

The inorganic salt is not in particular limited as long as it is a inorganic salt that can form a complex with an amido group and, for example, lithium chloride (LiCl), calcium chloride ($CaCl_2$), rhodan calcium [$Ca(SCN)_2$], and rhodan potassium (KSCN) may be mentioned.

The concentration of the acidic substance and/or the mineral salt in the aqueous solution is preferably 10 ppm to 50% by weight, more preferably 50 ppm to 20% by weight, and especially preferably 1 to 10% by weight. The concentration of the acidic substance and/or the mineral salt less than 10 ppm shows a tendency of making difficult efficient removal of the unreacted polyfunctional amine component from the semipermeable membrane. On the other hand, the concentration exceeding 50% by weight has a great influence on performance of the semipermeable membrane, and shows a tendency for permeation flux to deteriorate.

The water-soluble organic substance is not in particular limited, as long as it does not give adverse effect on membrane performance, and the substance include, for example, monohydric alcohols, such as methyl alcohol, ethyl alcohol, n-propyl alcohol, and isopropyl alcohol; polyhydric alcohols, such as ethylene glycol, triethylene glycol, and glycerin; ethers, such as ethylene glycol monomethyl ether, ethylene glycol monoethyl ether, and ethylene glycol monobutyl ether; polar solvents, such as dimethylformamide, dimethylacetamide, and n-methylpyrrolidone.

In view of the suppression effect of deterioration of removal performance and membrane performance of the unreacted polyfunctional amine component, the concentration of the water-soluble organic substance in the aqueous solution can be suitably adjusted for every material to be used, and it is approximately 1 to 90% by weight, more preferably 10 to 80% by weight, and especially preferably 20 to 50% by weight. Less than 1% by weight of the concentration of the water soluble organic substance shows a tendency of making difficult efficient removal of the unreacted polyfunctional amine component from the semipermeable membrane. On the other hand, the concentration exceeding 90% by weight has a great influence on performance of the semipermeable membrane, and shows a tendency for permeation flux to deteriorate.

3) A method of, first of all, making the composite semipermeable membrane contact with a solution including the water soluble organic substance, then making the semipermeable membrane contact with an aqueous solution containing the acidic substance to wash the membrane.

A reversed order of contact with solutions cannot fully remove the unreacted polyfunctional amine component. Firstly conducted contact of the composite semipermeable membrane with the solution containing the water soluble organic substance can accelerate hydrophilization and swelling of the membrane. Therefore, this process allows quick permeation of the aqueous solution including the acidic substance to an inner portion of the membrane in the subsequent contact treatment, and can increase washing effect.

In consideration of the suppression effect of deterioration of removal performance and membrane performance of the unreacted polyfunctional amine component, the concentration of the water soluble organic substance in the solution can be suitably adjusted for every materials to be used, and usually, it is 1 to 100% by weight, preferably 10 to 80% by weight, and more preferably 20 to 50% by weight. It is especially preferred to use the aqueous solution having the above described concentration. The concentration of the water soluble organic substance less than 1% by weight shows a tendency of making difficult efficient removal of the unreacted polyfunctional amine component from the semipermeable membrane.

The concentration of the acidic substance in the aqueous solution is preferably 10 ppm to 50% by weight, more preferably 50 ppm to 20% by weight, and especially preferably 1 to 10% by weight. The concentration of the acidic substance less than 10 ppm shows a tendency of making difficult efficient removal of the unreacted polyfunctional amine component from the semipermeable membrane. On the other hand, the concentration exceeding 50% by weight has a great influence on the performance of the semipermeable membrane.

In the membrane washing methods 1) to 3) described above, examples of the method of contacting the solution to the composite semipermeable membrane include all methods, such as a dipping, a pressurized water flow, a spray, an application, and a showering, and the dipping and the pressurized water flow methods are preferably used in order to obtain sufficient effect of contacting.

The contact period of time is not limited at all within a range acceptable by an allowable content of the unreacted polyfunctional amine component in the composite semipermeable membrane after the membrane washing treatment, and manufacturing restrictions, and any period of time may be adopted. Although the contact period of time cannot necessarily be specified, it is usually several seconds to tens of minutes, and preferably 10 seconds to 3 minutes. Since the amount of removal of the unreacted polyfunctional amine component reaches an equilibrium, removing effect does not necessarily improve even with longer contact period of time. When the contact period of time is excessively lengthened, there is conversely shown a tendency for the membrane performance and manufacturing efficiency to deteriorate. Although the contact temperature in particular will not be limited as long as the solution is in a temperature range allowing existence as a liquid, from a view point of removing effect of the unreacted polyfunctional amine component, of prevention of the membrane from deterioration, and of easiness of treatment etc. the contact temperature is preferably 10 to 90° C., more preferably 10 to 60° C., and especially preferably 10 to 45° C.

In the contact of the solution by the pressurized water flow method, the pressure is not in particular limited, as long as the pressure in use of this solution with respect to the semipermeable membrane is in a range acceptable by the semipermeable membrane and the physical strength of the members and the equipment for pressure application. The pressurized water flow is preferably performed at 0.1 to 10 MPa, and more preferably at 1.5 to 7.5 Mpa. The pressurized water flow at a pressure less than 0.1 Mpa shows a tendency of extending the contact period of time, in order to obtain necessary effect. And when exceeding 10 Mpa, compaction caused by the pressure is apt to decrease the permeation flux.

The present invention needs application of treatment to the porous support with additives by inclusion of at least one kind of the additives selected from the group consisting of antioxidants, antibacterial agents, antifungal agents, and moisturizers. Methods for inclusion of the additives in the porous support is not in particular limited, and preferred is a method for contact of an aqueous solution including at least one kind of additives selected from the group consisting of antioxidants, antibacterial agents, antifungal agents, and moisturizers to a face that does not have the skin layer of the porous support of the unwashed or washed composite semipermeable membrane produced by the method described above.

The antioxidant include, for example, sulfites, such as sodium sulfite, sodium hyposulfite, sodium bisulfite, potassium sulfite, potassium hydrogen hyposulfite; sulfur dioxide; citrates, such as isopropyl citrate; and Vitamins C, such as ascorbic acid, alkyl ascorbate, and sodium ascorbate.

The antibacterial agents and antifungal agents include, for example, silver based compounds; copper based compounds; photocatalytic compounds; chitosans; and catechins, such as catechin, epicatechin, gallocatechin, epigallocatechin, catechin gallate, epicatechin gallate, gallocatechin gallate, and epigallocatechin gallate.

The moisturizer includes, for example, organic acid alkali metal salts, such as sodium acetate, potassium acetate, sodium lactate, potassium lactate, sodium glutamate, and potassium glutamate; organic acid alkaline earth metal salts, such as magnesium acetate, calcium acetate, magnesium lactate, calcium lactate, magnesium glutamate, and calcium glutamate; inorganic acid alkaline metal salts, such as sodium hydrogencarbonate, potassium hydrogencarbonate, sodium carbonate, potassium carbonate, disodium monohydrogen phosphate, dipotassium monohydrogen phosphate, monosodium dihydrogen phosphate, monopotassium dihydrogen phosphate, sodium phosphate, potassium phosphate; inorganic acid alkaline earth metal salts, such as magnesium hydrogencarbonate, calcium hydrogencarbonate, magnesium carbonate, calcium carbonate, magnesium primary phosphate, calcium primary phosphate, magnesium secondary phosphate, calcium secondary phosphate, magnesium tertiary phosphate, calcium tertiary phosphate: alkali metal halides, such as sodium chloride; alkali earth metal halides, such as magnesium chloride; surfactants, such as sodium lauryl sulfate, lauryl potassium sulfate, sodium alkyl benzene sulfonate, and potassium alkylbenzene sulfonate; saccharides, such as glucose and saccharose; amino acids, such as glycine and leucine etc.

The concentration of the additives in the aqueous solution is not in particular limited, and it is preferably 100 ppm to 30% by weight, and more preferably 500 ppm to 10% by weight. The concentration of the additives less than 100 ppm does not sufficiently exhibit effect for controlling deterioration in water permeability and salt-blocking rate after long-term storage, showing a tendency of requiring a longer processing time. On the other hand, the concentration of additives exceeding 30% by weight causes increase in costs, showing a tendency of giving an adverse effect to film performance.

Methods for contacting the aqueous solution containing the additives in the porous support includes, for example, application method, spraying method of the aqueous solution containing the additives, or contact method with a vapor of the additives, etc., and is not limited to them, and publicly known method are employable. Alternatively, in the case of immersion of the composite semipermeable membrane in the aqueous solution containing the additives, immersion of the composite semipermeable membrane is performed in a state where the skin layer is closely contacted to a roll, in order to realize inclusion of most of the additives in the porous support.

In the case of application of an aqueous solution containing additives to the composite semipermeable membrane, the aqueous solution is preferably applied to only the surface of the porous support in order to prevent deterioration of performance of the skin layer.

Although the temperature of the aqueous solution is not in particular limited as long as the solution is in a temperature range that allows existence of the aqueous solution as a liquid, from viewpoints of exhibition of target effect, prevention of the membrane from deterioration, easiness of treatment, etc., it is preferably 10 to 90° C., more preferably 10 to 60° C., especially preferably 10 to 45° C.

Excessive aqueous solution may be removed after contact of the aqueous solution containing the additives in the composite semipermeable membrane by the above-described method. Removal methods include, for example, a contact type removal method with blades, made of plastics or rubbers, a non-contact type removal method with air knife, etc.

The content of the additives in the porous support may be suitably adjusted based on the kinds of additives, the grade of targeted effect etc., and, it is preferably 1 mg/m$^2$ to 100 g/m$^2$, and more preferably 10 mg/m$^2$ to 10 g/m$^2$ for sufficient expression of the targeted effect. The content of the additives less than 1 mg/m$^2$ shows a tendency of failing to exhibit sufficient deterioration inhibitory effect of the water permeability and the salt-blocking rate after long-term storage. On the other hand, the content exceeding 100 g/m$^2$ does not vary deterioration inhibitory effect of water permeability and salt-blocking rate after long-term storage for the increase of content, leading to possible lack of stability of water quality of the target compound caused by elution of the additives.

It is necessary for the porous support to have 95% by weight or more of content of the additives with respect to the whole composite semipermeable membrane, and preferably 96% by weight or more.

The amount and content of the additives included in the whole composite semipermeable membrane and porous support may be measured by the following method.

(Separate Method)

A composite semipermeable membrane is cut into a predetermined size and is separated into a skin layer and a porous support. As a method of separation, for example, a method wherein a pressure sensitive adhesive tape attached on the surface of the skin layer of the composite semipermeable membrane having a size of 50 mm×50 mm is separated after slight friction may be mentioned. By this method, the skin layer and a microporous layer on an uppermost surface of the porous support is separated together with the pressure sensitive adhesive tape. The remaining portion that does not attach to the tape is defined as a porous support. Subsequently, the separated porous support is boiled in a specified amount of pure water, the obtained extracted liquid is analyzed using publicly known methods of analysis, such as ion chromatograph analysis, GC analysis, absorption spectrometry, and refractive index analysis to determine the amount of the additives in the porous support. Furthermore, the composite semipermeable membrane cut into a predetermined size is also measured for the amount of additives in a similar way. The two obtained values are substituted for the following expression, and the content of additives in the porous support is calculated.

Contain rate (%)=[(contain in porous support)/(contain in composite semipermeable membrane)]×100

In the present invention, subsequently, the composite semipermeable membrane, to which the treatment with additives is applied with the method described above, may be dried to obtain a dried composite semipermeable membrane.

The temperature of drying treatment is not in particular limited, and it is preferably 20 to 150° C., and more preferably 40 to 130° C. The temperature less than 20° C. needs an excessively long drying treatment period, and likely gives insufficient drying. The temperature exceeding 150° C.

shows a tendency to cause decrease of membrane performance due to structural change of the membrane caused by heat.

The period of the drying treatment is not in particular limited, and it is preferred that drying is performed until the amount of solvents in the dried composite semipermeable membrane is 5% by weight or less.

In addition, in the case of production of a dry spiral element, the membrane may be processed into a spiral shape in any stage from production of the above-described skin layer to drying treatment. In detail, the composite semipermeable membrane may be processed into a spiral shape before the washing treatment of the membrane to produce a membrane unit. Alternatively, the composite semipermeable membrane may be processed into a spiral shape after treatment with additives to produce the membrane unit, and the composite semipermeable membrane may be processed into a spiral shape before the drying treatment to produce the membrane unit.

Furthermore, the membrane unit may be produced by simultaneous application of the washing treatment and the treatment with additives to the produced membrane unit. The same method as the one described above may be mentioned as the treatment method.

The dried composite semipermeable membrane and dry spiral element produced by such a method have extremely small content of unreacted components. A permeated liquid separated and refined or a target compounds condensed by using the composite semipermeable membrane, etc., includes extremely small amount of impurities, and has a high purity. The dried composite semipermeable membrane and the dry spiral element of the present invention have outstanding workability and preservability because it is a dry type. Furthermore, although the dried composite semipermeable membrane and the dry spiral element of the present invention are a dry type, they exhibit water permeability and salt-blocking rate equivalent to that of the wet type composite semipermeable membrane and spiral element, causing no deterioration of performance after long term storage.

For improvement in salt-blocking property, water permeability, anti-oxidation agent property, etc., of the dried composite semipermeable membrane or dry spiral element, various conventionally publicly known treatments may be applied.

EXAMPLE

The present invention will, hereinafter, be described with reference to Examples, but the present invention is not limited at all by these Examples.

(Measurement of Permeation Flux and Salt-blocking Rate)

A dried composite semipermeable membrane produced with a shape of a flat film is cut into a predetermined shape and size, and is set to a cell for flat film evaluation. An aqueous solution containing NaCl of about 1500 mg/L and adjusted to a pH of 6.5 to 7.5 with NaOH was forced to contact to a supply side, and a permeation side of the membrane at a differential pressure of 1.5 MPa at 25° C. A permeation velocity and an electric conductivity of the permeated water obtained by this operation were measured for, and a permeation flux ($m^3/m^2 \cdot d$) and a salt-blocking rate (%) were calculated. The correlation (calibration curve) of the NaCl concentration and the electric conductivity of the aqueous solution was beforehand made, and the salt-blocking rate was calculated by a following equation.

Salt-blocking rate (%)={1−(NaCl concentration [mg/L] in permeated liquid)/(NaCl concentration [mg/L] in supply solution)}×100

(Measurement of Content and Content Rate of Additives)

A prepared dried composite semipermeable membrane was cut into a size of 1 cm×3 cm to obtain samples A and B. A pressure sensitive adhesive tape (made by NITTO DENKO CORPORATION, No. 31-B) was attached on the surface of the skin layer of sample A, and the pressure sensitive adhesive tape was separated after light friction. The skin layer and the microporous layer on the uppermost surface of the porous support were removed together with the pressure sensitive adhesive tape. Subsequently, the separated porous support was immersed into 50 cc of pure water, and was boiled at 120° C. for 1 hour in a sealed state. The obtained extracted liquid was subjected to analysis with ion chromatography to obtain an amount of additives in the extracted liquid. Determination of the additives was performed by comparison to a calibration curve prepared using standard solutions beforehand prepared to several kinds of prescribed concentrations. Measurement conditions are shown as follows.

Analyzer: Ion chromatograph, manufactured by DIONEX CORPORATION, DX-320
Isolation column: Ion Pac AS15 (4 mm×250 mm)
Guard column: Ion Pac AG15 (4 mm×50 mm)
Detector: Conductometrical detector
Eluate: KOH 2 mM→10 mM
Eluate flow rate: 1.2 mL/min
Specimen injection: 50 μL Furthermore, sample B was immersed into 50 cc of pure water, and was boiled for 1 hour at 120° C. in a sealed state. Subsequently, the extracted liquid was subjected to analysis under the same conditions as described above to obtain an amount of additives in the extracted liquid. The two obtained value were substituted for the following expression, and the content rate of the additives in the porous support was calculated.

Content rate (%)=[(content in porous support)/(content in composite semipermeable membrane)]×100

Production Example 1

(Production of Porous Support)

A dope for manufacturing a membrane containing 18% by weight of a polysulfone (produced by Solvay, P-3500) dissolved in N,N-dimethylformamide (DMF) was uniformly applied so that it might give 200 μm in thickness in wet condition on a nonwoven fabric base material. Subsequently, it was immediately solidified by immersion in water at 40 to 50° C., and DMF as a solvent was completely extracted by washing. Thus a porous support having a polysulfone microporous layer was produced on the nonwoven fabric base material.

Example 1

An aqueous solution of amines containing 3% by weight of m-phenylenediamine, 3% by weight of triethylamine, and 6% by weight of camphorsulfonic acid was applied to the porous support, and then an excessive amount of the amine aqueous solution was removed to form a covering layer of the aqueous solution. Subsequently, an isooctane solution containing 0.2% by weight of trimesic acid chlorides was applied to the surface of the covering layer of the aqueous solution. Then, the excessive solution was removed, and the material was kept standing for 3 minutes in a hot air dryer at 120° C. to form a skin layer containing a polyamide resin on the porous support, an unwashed composite semipermeable membrane was obtained. After that time, the unwashed composite semipermeable membrane was immersed for 10 minutes at 50° C. in pure water for membrane washing treatment to produce a washed composite semipermeable membrane. Subsequently, a sodium acetate aqueous solution (concentration: 5% by weight) was applied to the surface (a face which does not have a formed skin layer) of the porous support of the washed composite semipermeable membrane under a condition of 30 cc/m² for treatment with additives. And treated composite semipermeable membrane stood to remove the excessive sodium acetate aqueous solution, and then was kept standing for 5 minutes in a hot air dryer at 80° C., finally producing a dried composite semipermeable membrane.

Example 2

A dried composite semipermeable membrane was produced in the same manner as in example 1, except for using a sodium lactate aqueous solution (concentration: 5% by weight) instead of the sodium acetate aqueous solution in example 1.

Example 3

A dried composite semipermeable membrane was produced in the same manner as in example 1, except for using a sodium hydrogen carbonate aqueous solution (concentration: 5% by weight) instead of the sodium acetate aqueous solution in example 1.

Example 4

A composite semipermeable membrane was produced in the same manner as in example 1, except for using a sodium bisulfite aqueous solution (concentration: 5% by weight) instead of the sodium acetate aqueous solution, and not drying after treatment with additives in example 1.

Example 5

A dried composite semipermeable membrane was produced in the same manner as in example 1, except for using a sodium bisulfite aqueous solution (concentration: 5% by weight) instead of the sodium acetate aqueous solution in example 1.

Comparative Example 1

A washed composite semipermeable membrane was produced in the same manner as in example 1. Subsequently, the washed composite semipermeable membrane was immersed in a sodium acetate aqueous solution (concentration: 5% by weight) for 1 minute at 25° C., and treatment with additives was applied. Then, the treated composite semipermeable membrane stood and thus the excessive sodium acetate aqueous solution was removed, and then was kept standing for 5 minutes in a hot air dryer at 80° C. to produce a dried composite semipermeable membrane.

Comparative Example 2

A washed composite semipermeable membrane was produced in the same manner as in example 1. Subsequently, a sodium acetate aqueous solution (concentration: 5% by weight) 25° C. was applied on the surface of the skin layer of the washed composite semipermeable membrane under a condition of 30 cc/m², the surface was uniformly smoothed using a PET film and then treatment with additives was applied. Then, the treated composite semipermeable membrane stood and thus the excessive sodium acetate aqueous solution was removed, and next was kept standing for 5 minutes in a hot air dryer at 80° C. to produce a dried composite semipermeable membrane.

Comparative Example 3

A dried composite semipermeable membrane was produced in the same manner as in example 1, except for not performing treatment with additives in example 1.

Comparative Example 4

A washed composite semipermeable membrane was produced in the same manner as in example 1. Appearance of mold in the skin layer was observed after storage for one week of the washed composite semipermeable membrane.

Comparative Example 5

An unwashed composite semipermeable membrane was produced in the same manner as in example 1.

TABLE 1

| | | | Content of additives (mg/m²) | | | Performance | | | |
| | | | Whole | | Content of | Initial performance | | one week after | |
| | Condition of membrane | Additive | composite semipermeable membrane | Porous support | additives to porous support (%) | Salt-blocking rate (%) | Permeation Flux (m³/m²·d) | Salt-blocking rate (%) | Permeation Flux (m³/m²·d) |
| --- | --- | --- | --- | --- | --- | --- | --- | --- | --- |
| Example 1 | Washed, dry | Sodium acetate | 790 | 780 | 98.7 | 99.3 | 0.8 | 99.3 | 0.8 |
| Example 2 | Washed, dry | Sodium lactate | 1050 | 1020 | 97.1 | 99.5 | 0.9 | 99.6 | 0.8 |
| Example 3 | Washed, dry | Sodium hydrogen carbonate | 570 | 550 | 96.5 | 99.3 | 0.6 | 99.2 | 0.6 |
| Example 4 | Washed, wet | Sodium bisulfite | 580 | 570 | 98.3 | 99.4 | 0.6 | 99.3 | 0.6 |

TABLE 1-continued

| | | Content of additives (mg/m²) | | Content of additives to porous support (%) | Initial performance | | Performance one week after | |
|---|---|---|---|---|---|---|---|---|
| | | Whole composite semipermeable membrane | Porous support | | | | | |
| | Condition of membrane | Additive | | | Salt-blocking rate (%) | Permeation Flux (m³/m²·d) | Salt-blocking rate (%) | Permeation Flux (m³/m²·d) |
| Example 5 | Washed, dry | Sodium bisulfite | 600 | 580 | 96.7 | 99.5 | 1.0 | 99.5 | 1.0 |
| Comparative Example 1 | Washed, dry | Sodium acetate | 820 | 740 | 90.2 | 98.9 | 0.9 | 98.7 | 0.8 |
| Comparative Example 2 | Washed, dry | Sodium acetate | 660 | 590 | 89.4 | 97.9 | 1.1 | 97.1 | 1.2 |
| Comparative Example 3 | Washed, dry | — | — | — | — | Measurement impossible (permeation flux <0.1) | | | |
| Comparative Example 4 | Washed, wet | — | — | — | — | 99.5 | 0.9 | 99.1 | 0.7 |
| Comparative Example 5 | Unwashed, dry | — | — | — | — | 99.5 | 0.9 | 99.0 | 1.4 |

As is clearly shown in table 1, a composite semipermeable membrane having water permeability and salt-blocking rate without deterioration after long-term storage may be obtained by mainly including specific additives mainly in a porous support.

What is claimed is:

1. A process for producing a composite semipermeable membrane comprising:
   forming a skin layer including a polyamide resin obtained by reaction between a polyfunctional amine component and a polyfunctional acid halide component on the surface of a porous support; and
   performing a treatment with additives onto the porous support by contact of an aqueous solution including at least one kind of additives selected from the group consisting of an antioxidant, an antibacterial agent, an antifungal agent, and a moisturizer, only to a face without the skin layer of the porous support,
   wherein the treatment with additives onto the porous support is performed by immersion of the composite semipermeable membrane in the aqueous solution in a state where the skin layer is closely contacted to a roll to thereby yield a composite semipermeable membrane wherein the porous support contains 95% by weight or more with respect to the whole composite semipermeable membrane of the one or more additives.

2. The process of claim 1, further comprising drying the treated composite semipermeable membrane.

3. The process of claim 1, wherein concentration of the additives in the aqueous solution is 100 ppm to 30% by weight.

4. The process of claim 1, wherein the treatment with additives onto the porous support is performed by applying the aqueous solution to a surface of the porous support.

5. The process of claim 1, wherein the resultant composite semipermeable membrane is a dried composite semipermeable membrane.

6. The process of claim 1, wherein the moisturizer is an organic acid metal salt and/or an inorganic acid metal salt.

7. The process of claim 6, wherein the organic acid metal salt is at least one kind of organic acid alkali metal salt selected from the group consisting of an alkali metal acetate, alkali metal lactate, and alkali metal glutamate.

8. The process of claim 6, wherein the inorganic acid metal salt is at least one kind of inorganic acid alkali metal salt selected from the group consisting of an alkali metal hydrogencarbonate, dialkali metal monohydrogen phosphate, and monoalkali metal dihydrogen phosphate.

9. The process of claim 1, wherein the content of the additive(s) in the porous support is 1 mg/m² to 100 g/m².

10. The process of claim 1, wherein the aqueous solution comprises the moisturizer.

11. The process of claim 10, wherein the moisturizer is an organic acid metal salt and/or an inorganic acid metal salt.

12. The process of claim 11, wherein the organic acid metal salt is at least one kind of organic acid alkali metal salt selected from the group consisting of an alkali metal acetate, alkali metal lactate, and alkali metal glutamate.

13. The process of claim 1, wherein the aqueous solution comprises about 5% by weight of sodium acetate.

14. The process of claim 1, wherein the composite semipermeable membrane has a greater salt-blocking rate relative to a second composite semipermeable membrane prepared by contacting both sides with the aqueous solution.

15. The process of claim 1, further comprising removing an excess of the aqueous solution from the face without the skin layer.

16. The process of claim 15, wherein removing the excess of the aqueous solution from the face without the skin layer comprises applying a blade or an air knife to the face without the skin layer.

* * * * *

UNITED STATES PATENT AND TRADEMARK OFFICE
CERTIFICATE OF CORRECTION

PATENT NO. : 8,851,297 B2
APPLICATION NO. : 12/606518
DATED : October 7, 2014
INVENTOR(S) : Tomomi Ohara et al.

Page 1 of 1

It is certified that error appears in the above-identified patent and that said Letters Patent is hereby corrected as shown below:

In the Specification,

In column 3 at line 29 (approx.), Change "moisturing" to --moisturizing--.

In column 3 at line 34 (approx.), Change "moisturing" to --moisturizing--.

In column 5 at line 43, Change "pinhole." to --pinhole,--.

Signed and Sealed this
Eighteenth Day of August, 2015

Michelle K. Lee
*Director of the United States Patent and Trademark Office*